United States Patent [19]

Mills et al.

[11] 4,112,994
[45] Sep. 12, 1978

[54] PNEUMATIC TIRES HAVING LOW ASPECT RATIO

[75] Inventors: Anthony Mark Mills; David Lyndon Buck, both of Sutton Coldfield, England

[73] Assignee: Dunlop Limited, London, England

[21] Appl. No.: 582,365

[22] Filed: May 30, 1975

Related U.S. Application Data

[63] Continuation of Ser. No. 392,209, Aug. 28, 1973, abandoned.

[30] Foreign Application Priority Data

Sep. 1, 1972 [GB] United Kingdom ............... 40641/72

[51] Int. Cl.$^2$ .................. B60C 13/00; B60C 17/00; B60C 9/02
[52] U.S. Cl. .................. 152/354 R; 152/209 R; 152/330 R; 152/352 R
[58] Field of Search ........... 152/209 R, 330 R, 352 R, 152/357 R, 252, 356, 209 NT, 354

[56] References Cited

U.S. PATENT DOCUMENTS

| | | | |
|---|---|---|---|
| 1,201,744 | 10/1916 | Kremer | 152/209 R |
| 1,337,660 | 4/1920 | Killen | 152/209 WT |
| 2,240,866 | 5/1941 | Smith | 152/209 R |
| 2,986,191 | 5/1961 | Bechadolph | 152/356 |
| 3,486,546 | 12/1969 | Sidles et al. | 152/357 X |
| 3,486,547 | 12/1969 | Powers | 152/352 |
| 3,525,654 | 8/1970 | Uotani et al. | 152/330 R X |
| 3,543,827 | 12/1970 | Roberts et al. | 152/209 R |
| 3,639,308 | 2/1972 | Topcik | 152/330 R |
| 3,672,423 | 6/1972 | Duduk | 152/356 |
| 3,712,360 | 1/1973 | Torti et al. | 152/357 X |
| 3,746,669 | 7/1973 | Dunnom et al. | 152/330 R X |
| 3,782,438 | 1/1974 | Mirtain | 152/209 R |
| 3,805,868 | 4/1974 | Tangorra | 152/357 R |

FOREIGN PATENT DOCUMENTS

| | | | |
|---|---|---|---|
| 1,418,578 | 10/1965 | France | 152/357 R |
| 1,061,017 | 3/1967 | United Kingdom | 152/330 |

*Primary Examiner*—Robert B. Reeves
*Assistant Examiner*—David A. Scherbel
*Attorney, Agent, or Firm*—Stevens, Davis, Miller & Mosher

[57] ABSTRACT

A pneumatic tire, particularly a motorcycle tire, having an aspect ratio of less than 65% and a rounded tread profile, the bias angle of the tire carcass plies being less than 22°.

36 Claims, 4 Drawing Figures

PNEUMATIC TIRES HAVING LOW ASPECT RATIO

This is a continuation of application Ser. No. 392,209 filed Aug. 28, 1973, now abandoned.

This invention relates to pneumatic tires, particularly to motorcycle tires as used in racing on tracks which include steeply banked corners such as at Talledega, U.S.A.

When a motorcycle travels around these steeply banked corners at high speeds, e.g. over 150 m.p.h., it will be appreciated that a relatively high centrifugal force is generated and the tire has to withstand this in addition to the usual forces which arise when travelling at high speeds on "flat" tracks. The forces, especially the high centrifugal force, can cause the tire and especially the tire tread, to overheat and the rubber to blister, with possibly disastrous consequences.

It is an object of the present invention to provide a tire which will more readily withstand these excessive forces.

In accordance with the invention a tire has an aspect ratio of less than 65% and a tread of rounded cross-sectional profile, and comprises a carcass of crossed plies, the bias angle of each carcass ply being less than 22° with respect to the mid-circumferential plane of the tire. The aspect ratio may be less than 55%.

Preferably also the tire is provided with the following features:

(a) the tread comprises a compound which has a low hysteresis loss and therefore develops relatively very little heat during running; such a compound is commonly known as "cool running".

(b) The tread curvature is relatively small, i.e. the cross-sectional profile is as "flat" as possible, in order to increase the surface area of the contact patch for a given tire size (section width). However, since race tracks in addition to have steeply-banked corners have non-banked corners it will be appreciated that the tread profile needs to be rounded in cross-section in order that the motorcycle can 'lean over' when rounding such a corner. The curvature thus chosen has to be a compromise between the conflicting design requirements and depends to at least some extent on the ratio of banked to non-banked corners on a track.

(c) The number and size of tread grooves is made small, the "land-to-sea" ratio of the tread surface the total area of the tread surface designed to contact the ground in normal use (the land) to the area of the imaginary surface of the grooves, slots and the like formed in the tread rubber (the sea), preferably being 4 to 1 or greater. However, the ratio chosen can depend on the amount of 'grip' required for a particular track.

The two features referred to in the two immediately preceding paragraphs (b) and (c), are two aspects of a general feature that the surface area of rubber contacting the ground in the tread contact area should be as large as possible for a given tire size. This enables the load on the tire, particularly that created by the centrifugal force referred to previously to be spread over as large an area as possible. Thus the pressure in the contact area is reduced and the resultant heat generated (which is dependent on pressure rather than load), also reduced.

(d) The tire is designed such that there is very little change in shape between the as-moulded state and the inflated state. This means that there is very little "trellising" of the carcass cords on inflation so that at the start of a race the rubber between cords in between adjacent plies and between adjacent cords in the same ply is under little or no stress (particularly shear stress) and the amount of heat generated in and by the tire rubber during a race is smaller than would be generated if the rubber were stressed.

(e) The pattern of grooves or the like with which the tire tread is provided is not complex and is not provided with sharp corners (as in a zig-zag groove) where otherwise cracking might occur. preferably a groove of wavy or sinusoidal form is provided.

In addition the ratio of the maximum cross-sectional width to the width of the wheel rim for which the tire is designed may be greater than 150% and even greater than 170%.

One example of a tire in accordance with the invention will now be described with reference to the accompanying drawings of which:

It will be noted that the figures on the drawings indicate various dimensions in millimeters for a 350/525-18 motorcycle tire.

Figure 3:
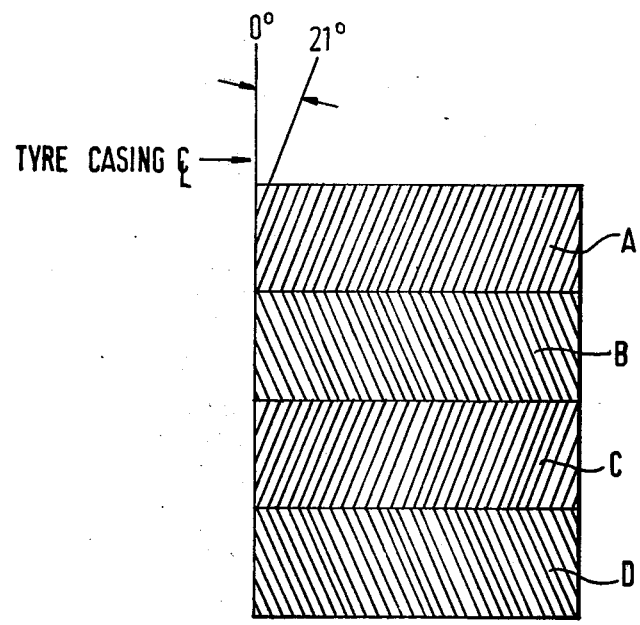
FIGS. 3 and 4 illustrates diagrammatically two alternative carcass constructions.
Figure 4:
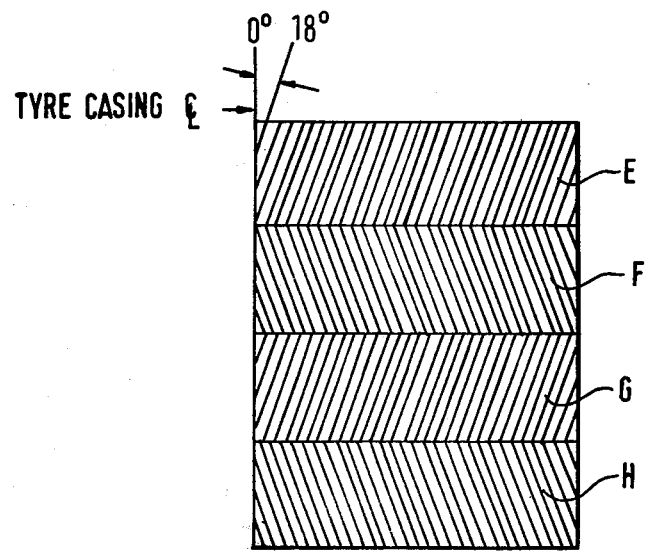

The tire as shown in the drawings has an aspect ratio of 62.3% and is provided with a carcass of four plies A, B, C and D of nylon cords which have a bias angle of 21° with respect to the mid-circumferential plane. Alternatively the bias angle of each of the four plies E, F, G, H may be 20° or 18°. Bias angles of 21° and 18° are illustrated in FIGS. 3 and 4.

Figure 1:
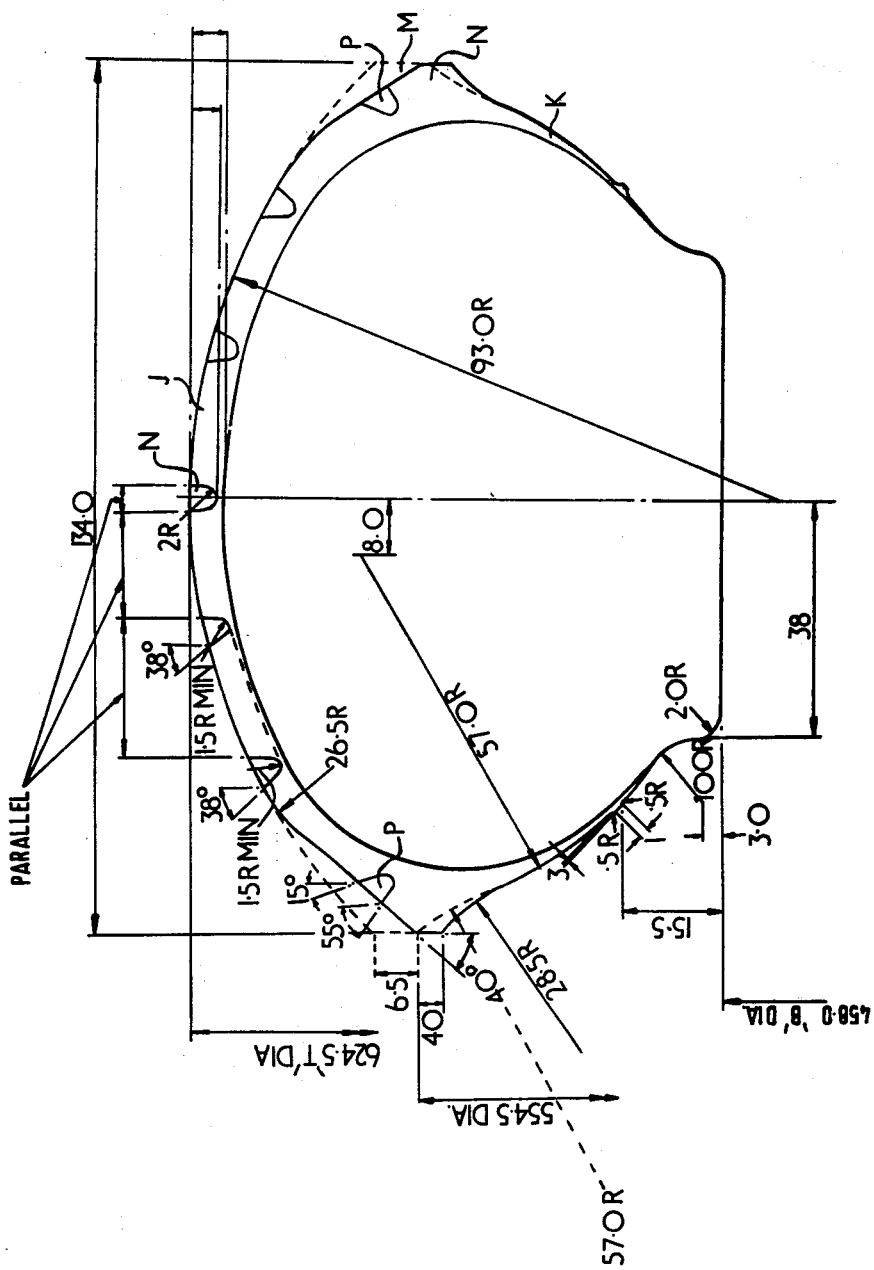
FIG. 1 shows an axial cross-section on line Z—Z of FIG. 2 through the tread and sidewall rubber of the tire, the carcass being omitted.

As can be seen from the FIG. 1 the curvature of the tire tread J is relatively small, 93 mm radius at the center of the tread, so that there is a relatively sharp angle between the general line of the sidewall K and the tangent to the tread surface at the tread edge L. The width of the tire at the tread edge is the maximum width of the tire and this is considerably greater than the width of the tire at the bead region. The ratio of the maximum cross-sectional width of the tire (134 mm) to the width of the wheel rim (76 mm) for which the tire is designed is 176%. The dotted portion M at the tread edges indicate an alternative configuration for the tire, the tread of which has a smaller curvature.

Figure 2:
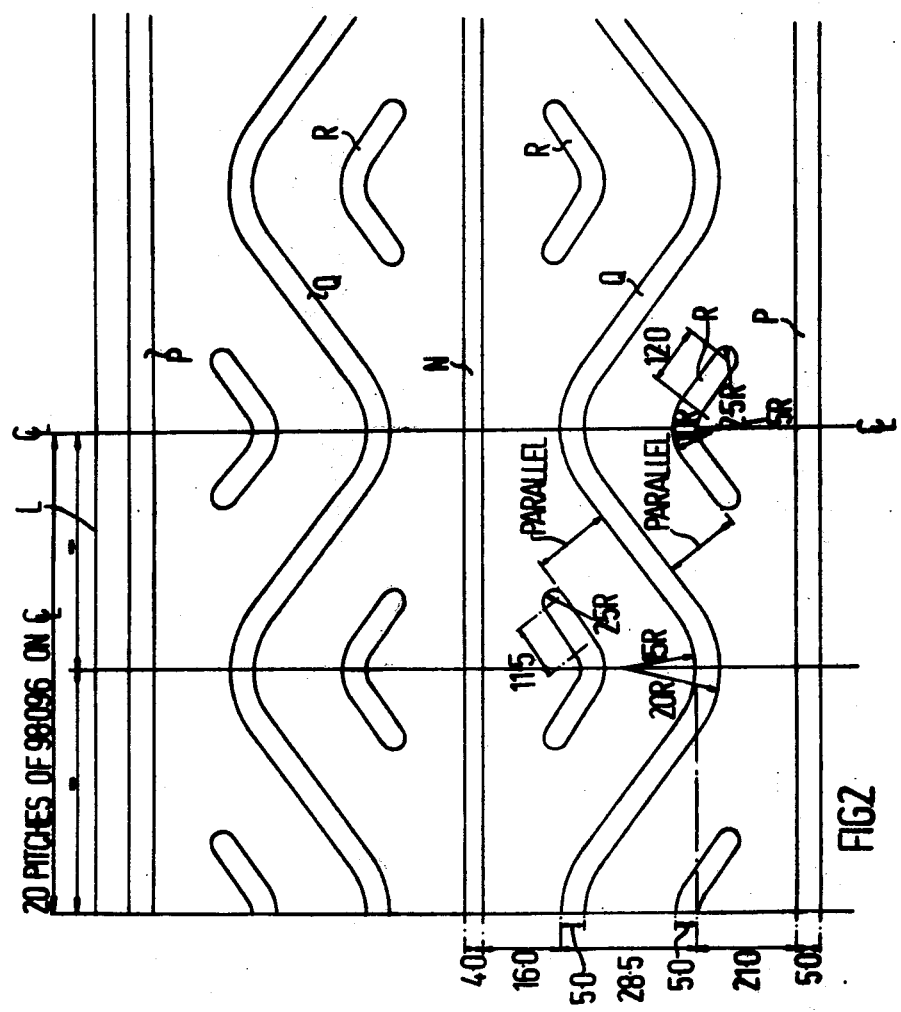
FIG. 2 shows a fragmentary plan view (projected onto a flat surface) of the tire tread.

The tread of the tire is formed with single straight circumferential grooves at the tread centre (N), and adjacent each edge of the tread (P). On each side of the tread center is a sinusoidal groove Q which has a relatively long pitch so as to avoid any sharp corners. The two sinusoidal grooves are out of phase, a 'crest' of one groove coinciding with a 'trough' in the other. Alternatively the two grooves could be in phase. Short grooves R, V-shaped in plan but having a rounded form at the groove apex are provided alternately on each side of each sinusoidal groove as shown in FIG. 2. In an alternative arrangement (not shown) the two limbs of the axially outer V-grooves R extend axially outwards to end in the adjacent groove P adjacent the tread edge to provide extra gripping edges near the tread edge.

The sides of the grooves nearer the mid-circumferential plane of the tire make a larger angle with the tangent to the tread at that point, than the other groove sides. This is to avoid an "undercut" with respect to the plane perpendicular to the tire mid-circumferential plane, and which under the influence of centrifugal forces could lead to cracking.

The tread rubber comprises low hysteresis loss compound relative to other compounds conventionally used for racing tire treads, and has the general following composition:

TABLE A

| Component | Parts |
| --- | --- |
| Natural Rubber | 50–70 |
| LTP (styrene butadiene rubber containing 23.5% Styrene) | 50–30 |
| Carbon Black | 55–65 |
| Extender Oil | 7.5–12.5 |
| Sulphur | 1.75–2.25 |

Two specific examples of compositions suitable for use with the above tire are given below:

| Compound I Component | Parts |
| --- | --- |
| Natural Rubber | 50.0 |
| LTP | 50.0 |
| Carbon Black | 60.0 |
| *Dutrex RT (Highly aromatic extender oil | 10.0 |
| Zinc Oxide | 5.0 |
| Stearic Acid | 1.0 |
| *Nonox ZA (N-phenyl n-isopropyl paraffiniline diamine) | 3.0 |
| *Flectol H (Polytrimethyl dihydro quinniline | 2.0 |
| Sulphur | 2.0 |
| *Vulcazit DZ (Dicyclo hexyl benthiozyl sulphenamide | 1.0 |
| PVI 50 (Cyclohexyl Thiophthalimide) | 0.5 |
| | 184.5 |

| Compound II | |
| --- | --- |
| Natural Rubber | 70.0 |
| LTP | 30.0 |
| Carbon Black | 60.0 |
| *Dutrex RT | 10.0 |
| Zinc Oxide | 5.0 |
| Stearic Acid | 1.0 |
| *Nonox ZA | 3.0 |
| *Flectol H | 2.0 |
| Sulphur | 2.0 |
| *Vulcazit DZ | 1.0 |
| PVI 50 | 0.5 |
| | 184.5 |

*Trade Mark

The resilience of Compound I measured on a Dunlop Healey pendulum at 50° C. is 50 and the hardness at room temperature is 66° BS. The corresponding figures for Compound II are 55 and 64° BS respectively.

Having now described my invention-what I claim is:

1. A pneumatic tire having two bead regions, an aspect ratio of less than 65% and a rubber tread, having a profile rounded in cross-section, comprising a carcass of crossed plies extending from one bead region to the other and comprising cords which are placed in tension when the tire is inflated, the bias angle of each carcass ply being less than 22° with respect to the mid-circumferential plane of the tire, the width of the tread measured in a direction parallel to the axis of the tire between the edges thereof being the maximum width of the tire measured in said direction, the tread rubber having a resilience measured on a Dunlop Healey Pendulum at 50° C of the order of 50 to 55 and a hardness at room temperature of the order of 64° to 66° BS, and the tread rubber has the following composition:

| Component | Parts |
| --- | --- |
| Natural Rubber | 50–70 |
| LTP (styrene butadiene rubber containing 23.5% styrene) | 50–30 |
| Carbon Black | 55–65 |
| Extender Oil | 7.5–12.5 |
| Sulphur | 1.75–2.25 |

2. A pneumatic tire according to claim 1 having an aspect ratio of less than 55°.

3. A pneumatic tire according to claim 1 wherein the bias angle is 20°.

4. A pneumatic tire according to claim 1 wherein the bias angle is 18°.

5. A pneumatic tire according to claim 1 wherein the land to sea ratio of the tread surface is at least 40 to 1.

6. A pneumatic tire according to claim 1 wherein the shape of the tire in the inflated state is substantially the same as the shape of the tire in the as-moulded state.

7. A pneumatic tire according to claim 1 comprising a tread pattern of grooves provided with rounded corners.

8. A pneumatic tire according to claim 1 comprising a tread provided with a pattern of grooves of tortuous form.

9. A pneumatic tire according to claim 1 wherein the ratio of the maximum cross-sectional width of the tire to the width of the wheel rim for which the tire is designed is greater than 150%

10. A pneumatic tire according to claim 1 wherein the ratio of the maximum cross-sectional width of the tire to the width of the wheel rim for which the tire is designed is greater than 170%

11. A pneumatic tire according to claim 1 comprising at least one tread groove, the side of the groove nearer the mid-circumferential plane of the tire making a larger angle with the tangent to the tread at that point, than the other side of the groove.

12. A pneumatic tire according to claim 1 which is a motorcycle tire.

13. A pneumatic tire having two bead regions, an aspect ratio of less than 65% and a rubber tread, having a profile rounded in cross-section, comprising a carcass of crossed plies extending from one bead region to the other and comprising cords which are placed in tension when the tire is inflated, the bias angle of each carcass ply being less than 22° with respect to the mid-circumferential plane of the tire, the width of the tread measured in a direction parallel to the axis of the tire between the edges thereof being the maximum width of the tire measured in said direction, the tread rubber having a resilience measured on a Dunlop Healey Pendulum at 50° C of the order of 50 to 55 and a hardness at room temperature on the order of 64° to 66° BS and the tread rubber has the following composition:

| Component | Parts |
| --- | --- |
| Natural Rubber | 50.0 |
| LTP | 50.0 |
| Carbon Black | 60.0 |
| *Dutrex RT (Highly aromatic extender oil) | 10.0 |
| Zinc Oxide | 5.0 |
| Stearic Acid | 1.0 |

-continued

| Component | Parts |
|---|---|
| *Nonox ZA (N-phenyl n-isopropyl paraffiniline diamine) | 3.0 |
| *Flectol H (Polytrimethyl dihydro quinniline) | 2.0 |
| Sulphur | 2.0 |
| *Vulcazit DZ (Dicyclo hexyl benthiozyl sulphenamide) | 1.0 |
| PVI 50 (Cyclohexyl Thiophthalimide) | 0.5 |
| | 184.5 |

*Trademark

14. A pneumatic tire according to claim 13 having an aspect ratio of less than 55°.

15. A pneumatic tire according to claim 13 wherein the bias angle is 20°.

16. A pneumatic tire according to claim 13 wherein the bias angle is 18°.

17. A pneumatic tire according to claim 13 wherein the land to sea ratio of the tread surface is at least 4 to 1.

18. A pneumatic tire according to claim 13 wherein the shape of the tire in the inflated state is substantially the same as the shape of the tire in the as-moulded state.

19. A pneumatic tire according to claim 13 comprising a tread pattern of grooves provided with rounded corners.

20. A pneumatic tire according to claim 13 comprising a tread provided with a pattern of grooves of tortuous form.

21. A pneumatic tire according to claim 13 wherein the ratio of the maximum cross-sectional width of the tire to the width of the wheel rim for which the tire is designed is greater than 150%.

22. A pneumatic tire according to claim 13 wherein the ratio of the maximum cross-sectional width of the tire to the width of the wheel rim for which the tire is designed is greater than 170%.

23. A pneumatic tire according to claim 13 comprising at least one tread groove, the side of the groove nearer the mid-circumferential plane of the tire making a larger angle with the tangent to the tread at that point, than the other side of the groove.

24. A pneumatic tire according to claim 13 which is a motorcycle tire.

25. A pneumatic tire having two bead regions, an aspect ratio of less than 65% and a rubber tread, having a profile rounded in cross-section, comprising a carcass of crossed plies extending from one bead region to the other and comprising cords which are placed in tension when the tire is inflated, the bias angle of each carcass ply being less than 22° with respect to the mid-circumferential plane of the tire, the width of the tread measured in a direction parallel to the axis of the tire between the edges thereof being the maximum width of the tire measured in said direction, the tread rubber having a resilience measured on a Dunlop Healey Pendulum at 50° C of the order of 50 to 55 and a hardness at room temperature of the order of 64° to 66° BS, and the tread rubber has the following composition:

| Component | Parts |
|---|---|
| Natural Rubber | 70.0 |
| LTP | 30.0 |
| Carbon Black | 60.0 |
| *Dutrex RT | 10.0 |
| Zinc Oxide | 5.0 |
| Stearic Acid | 1.0 |
| *Nonox ZA | 3.0 |
| *Flectol H | 2.0 |
| Sulphur | 2.0 |
| *Vulcazit DZ | 1.0 |
| PVI 50 | 0.5 |
| | 184.5 |

*Trademark

26. A pneumatic tire according to claim 25 having an aspect ratio of less than 55°.

27. A pneumatic tire according to claim 25 wherein the bias angle is 20°.

28. A pneumatic tire according to claim 25 wherein the bias angle is 18°.

29. A pneumatic tire according to claim 25 wherein the land to sea ratio of the tread surface is at least 4 to 1.

30. A pneumatic tire according to claim 25 wherein the shape of the tire in the inflated state is substantially the same as the shape of the tire in the as-moulded state.

31. A pneumatic tire according to claim 25 comprising a tread pattern of grooves provided with rounded corners.

32. A pneumatic tire according to claim 25 comprising a tread provided with a pattern of grooves of tortuous form.

33. A pneumatic tire according to claim 25 wherein the ratio of the maximum cross-sectional width of the tire to the width of the wheel rim for which the tire is designed is greater than 150%.

34. A pneumatic tire according to claim 25 wherein the ratio of the maximum cross-sectional width of the tire to the width of the wheel rim for which the tire is designed is greater than 170%.

35. A pneumatic tire according to claim 25 comprising at least one tread groove, the side of the groove nearer the mid-circumferential plane of the tire making a larger angle with the tangent to the tread at that point, than the other side of the groove.

36. A pneumatic tire according to claim 25 which is a motorcycle tire.

* * * * *